M. VON RECKLINGHAUSEN.
MEANS FOR IMPROVING A VACUUM.
APPLICATION FILED JULY 29, 1913.
1,110,576.
Patented Sept. 15, 1914.
2 SHEETS—SHEET 1.
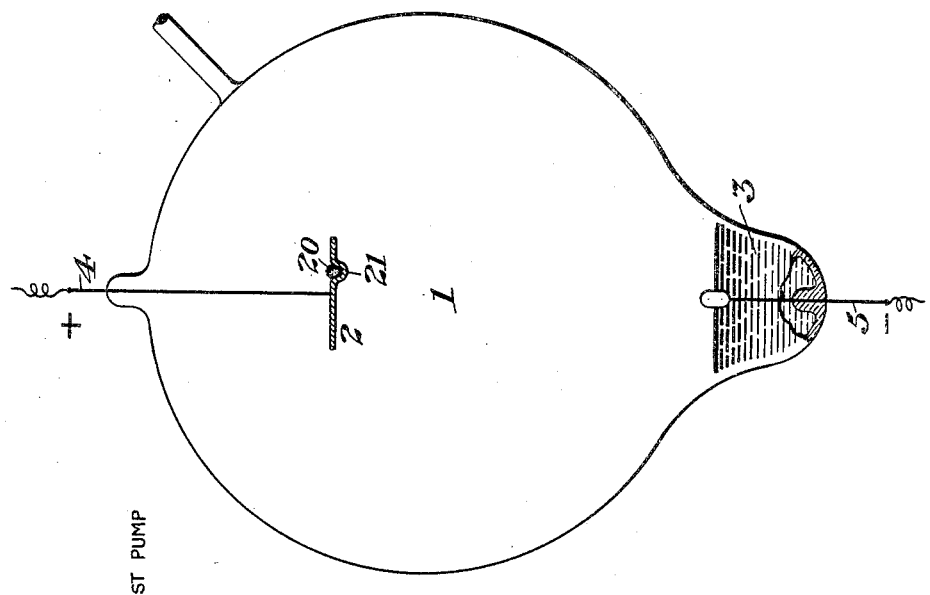
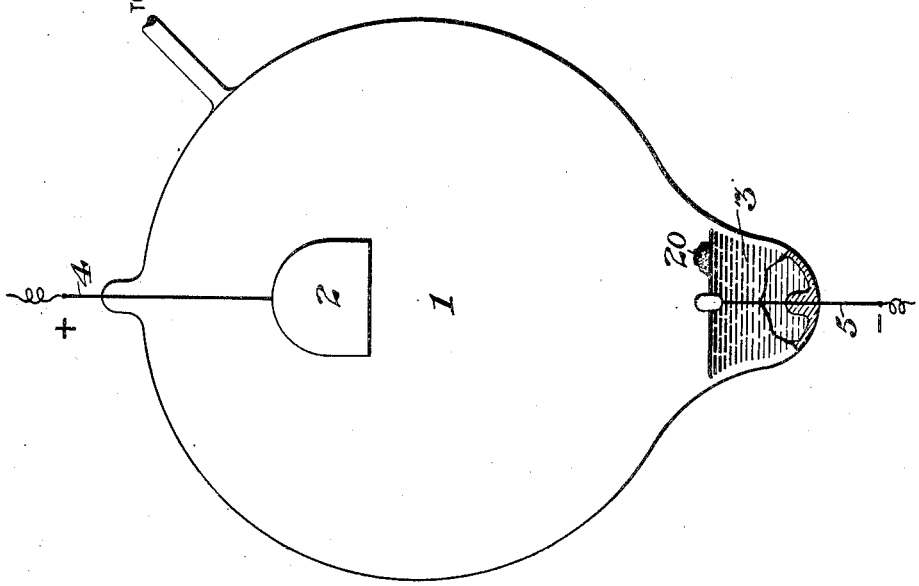
Witnesses:
Chas. F. Clagett
Harold B. Woodward.
Inventor
Max von Recklinghausen
By his Attorney
George H. Stockridge

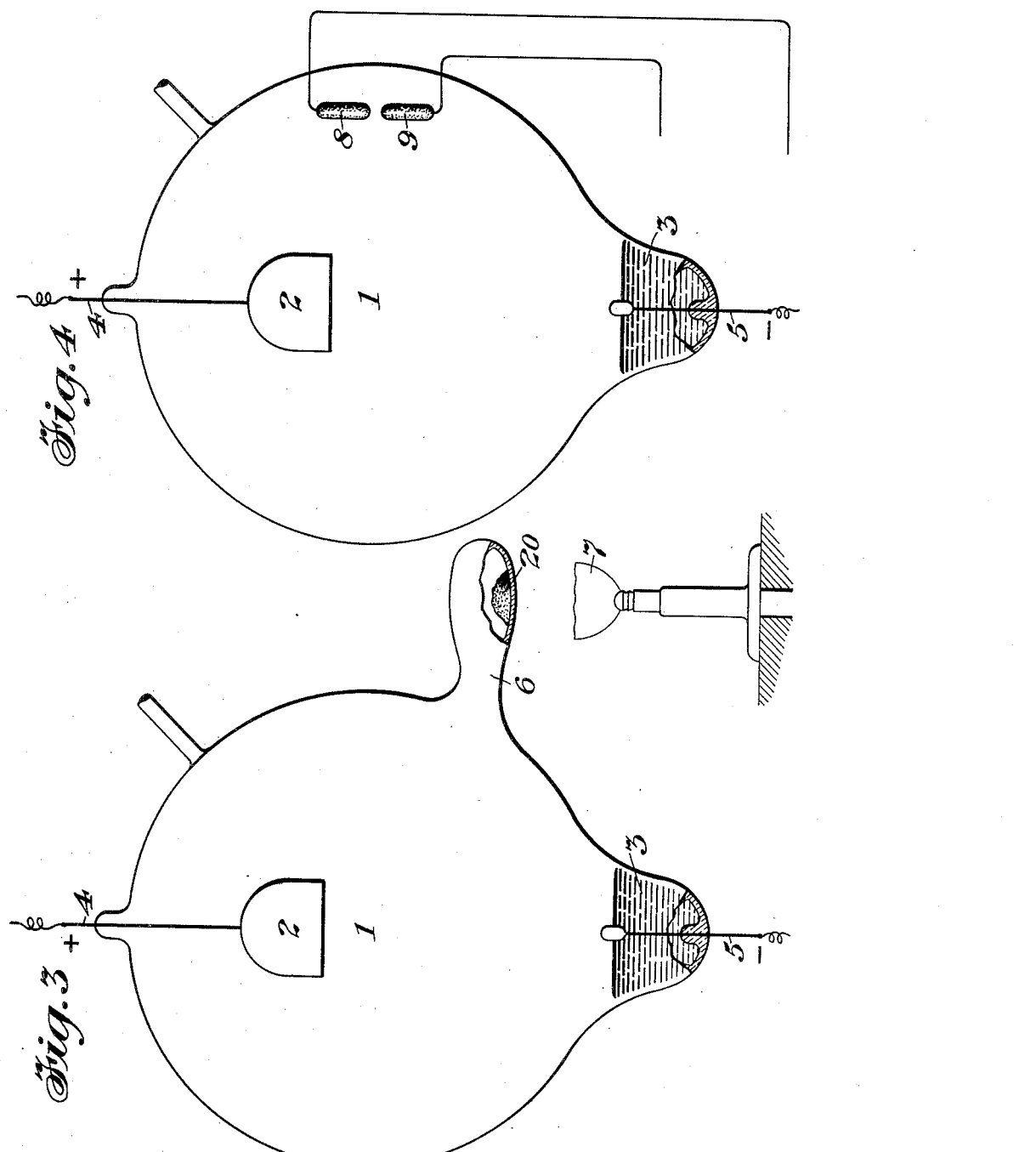

UNITED STATES PATENT OFFICE.

MAX VON RECKLINGHAUSEN, OF SURESNES, FRANCE, ASSIGNOR TO COOPER HEWITT ELECTRIC COMPANY, OF HOBOKEN, NEW JERSEY, A CORPORATION OF NEW JERSEY.

MEANS FOR IMPROVING A VACUUM.

1,110,576.  Specification of Letters Patent.  Patented Sept. 15, 1914.

Application filed July 29, 1913. Serial No. 781,896.

*To all whom it may concern:*

Be it known that I, MAX VON RECKLINGHAUSEN, a subject of the Emperor of Germany, and resident of Suresnes, Seine, France, have invented certain new and useful improvements in Means for Improving a Vacuum, of which the following is a specification.

Certain metals when properly heated are capable of absorbing both oxygen and nitrogen and are therefore suited to assist in the creation of a vacuum inside a container which is sealed or to be sealed. Such metals may be made use of in exhausting tubes for the well-known mercury vapor apparatus and it is to this object mainly that the present invention applies. Among the metals which might be used for this purpose are magnesium, boron and titanium. In the case of magnesium, however, the metal in its active condition is likely to attack the glass and for this reason I suggest the use of boron or titanium as the substance which may be utilized for the purpose indicated above, for which materials any other having the quality of absorbing oxygen and nitrogen and of not attacking the glass may be substituted.

In general I prefer to place the metal, whether boron or titanium, in such a position that it can readily be heated either by the action of the electrodes or through some outside source of heat, as by an electric current or other source.

In the drawings, Figures 1, 2, 3 and 4 illustrate four different modes of heating the selected materials.

Referring to the drawings in detail 1 is the container of a mercury vapor converter, 2 is a positive electrode therefor, which may be of iron, and 3 is a negative electrode of mercury. Suitable lead wires, 4 and 5, connect with the respective electrodes. The apparatus is pumped out in the usual way and sealed off when desired.

I supply boron or titanium or other material having the described qualities in the form of a solid or a powder and provide means for causing it to be heated to render it active for absorbing oxygen and nitrogen and thus improving the vacuum.

I may place it on the negative electrode where it will be heated by the negative electrode flame, as illustrated at 20 in Fig. 1; or in a depression 21 in the positive electrode, where it will become heated when the usual process of driving off the occluded gases from a solid positive electrode is employed, as illustrated in Fig. 2; or I may place it in a separate pocket, as 6, connected with the container, the source of heat being a flame, 7, or other external source, as illustrated in Fig. 3; or I may shape the boron or other selected material into electrodes as 8 and 9, and form an arc between them (thereby heating them), as illustrated in Fig. 4. In the last named case a suitable source of current (not shown) may be employed for supplying the necessary electrical energy.

The invention is not limited to being used with mercury vapor apparatus alone, as will be readily understood.

The disclosure herein made is practically identical with that made in my application Serial Number 218,830, filed July 30th, 1904, and the renewal thereof, Serial Number 709,831, filed July 16th, 1912.

I claim as my invention:

In a vacuum electric apparatus, the combination with an hermetically sealed and exhausted envelop and suitable electrodes therein, of a body of metallic boron therein shaped as an electrode for an electric arc, a second electrode coöperating therewith, together with electrical means for temporarily passing current from said boron to said coöperating electrode whereby the boron is heated and the residual gases are absorbed.

Signed at New York in the county of New York and State of New York this 28th day of July A. D. 1913.

MAX VON RECKLINGHAUSEN.

Witnesses:
HAROLD B. WOODWARD,
GEORGE H. STOCKBRIDGE.